United States Patent [19]
McEwen et al.

[11] Patent Number: 6,050,788
[45] Date of Patent: Apr. 18, 2000

[54] PUMP WITH IMPROVED SEAL FOR FILTRATION SYSTEMS

[75] Inventors: Stephen N. McEwen, Bowling Green; Richard A. Hallett, Delta; Robert F. Benschoter, Portage; Scott M. McEwen, Bowling Green; Anthony J. Palumbo, Perrysburg, all of Ohio

[73] Assignee: Henry Filters, Inc., Bowling Green, Ohio

[21] Appl. No.: 08/910,141

[22] Filed: Aug. 12, 1997

Related U.S. Application Data

[62] Division of application No. 08/447,806, May 23, 1995, Pat. No. 5,655,849, which is a division of application No. 08/169,678, Dec. 17, 1993, Pat. No. 5,503,520.

[51] Int. Cl.[7] .................................................. F04B 17/03
[52] U.S. Cl. ............................ 417/423.11; 417/424.1; 277/367; 277/408
[58] Field of Search ........................ 417/423.11, 424.1; 415/111; 277/367, 408, 401, 361

[56] References Cited

U.S. PATENT DOCUMENTS

| | | | |
|---|---|---|---|
| 3,698,830 | 10/1972 | Goyne | 415/111 |
| 4,466,619 | 8/1984 | Adams | 277/15 |
| 4,634,134 | 1/1987 | Entrikin | 277/12 |
| 5,116,066 | 5/1992 | Crawford | 277/81 R |
| 5,346,361 | 9/1994 | Jurgill et al. | 415/111 |
| 5,351,972 | 10/1994 | Anderberg | 277/59 |
| 5,489,105 | 2/1996 | Attenasio et al. | 277/38 |

*Primary Examiner*—Charles G. Freay
*Assistant Examiner*—Paul L. Ratcliffe
*Attorney, Agent, or Firm*—Howard & Howard

[57] ABSTRACT

A pump for pumping fluids in a filtration system is disclosed. The pump has a thrust balancing means to reduce axial loads on motor bearings of the pump during operation of the pump. A drive system of the pump includes an elongate flexible shaft interconnecting a drive shaft and an impeller shaft. The elongate flexible shaft bends and twists to accommodate misalignment during assembly of the drive system. A seal assembly is provided for sealing about a drive shaft. The seal assembly is evacuated to prevent pumped fluid from contaminating fluids in the motor. A concentric coupling and method for making the same are taught which include a cylindrical block which is concentrically bored and cut into an annular L-shaped segment having an L-shaped notch and a semi-cylindrical mating segment which is received into the notch. The coupling concentrically joins a pair of shafts together.

6 Claims, 5 Drawing Sheets

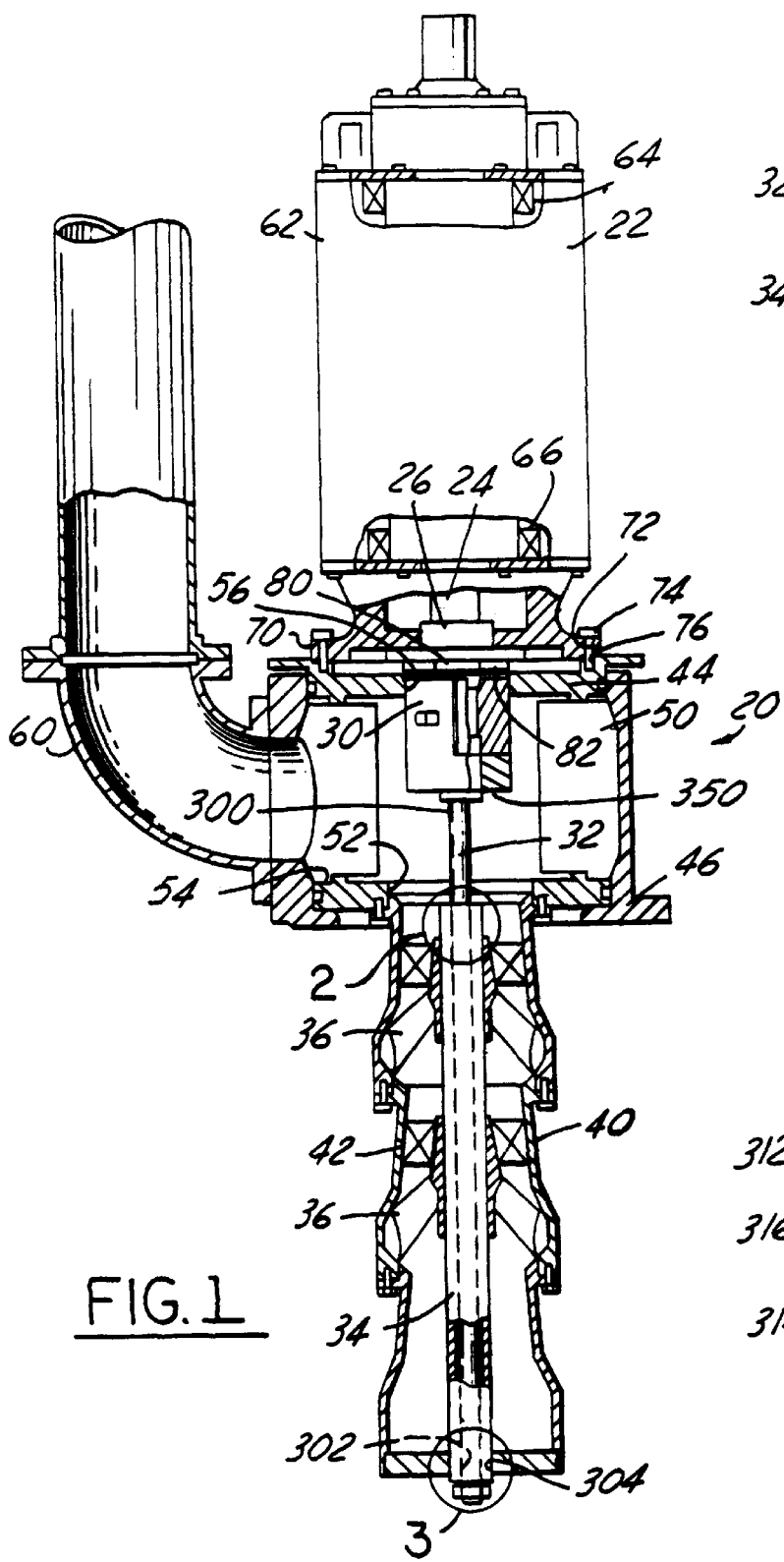
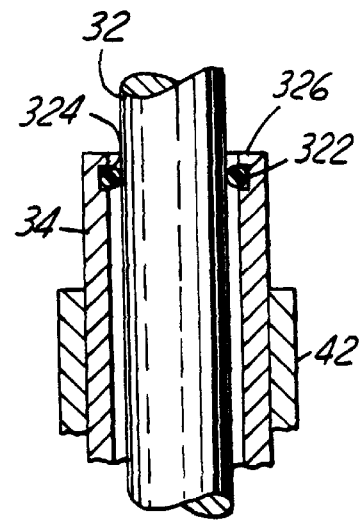
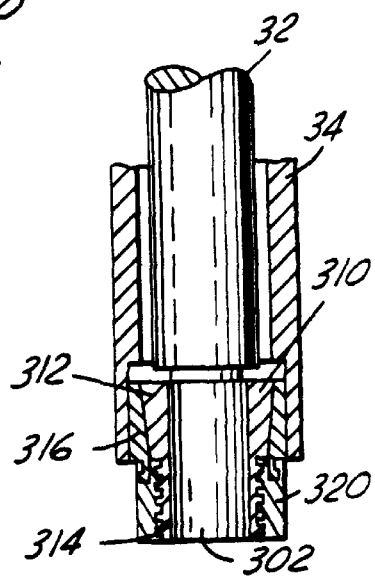
FIG. 1
FIG. 2
FIG. 3

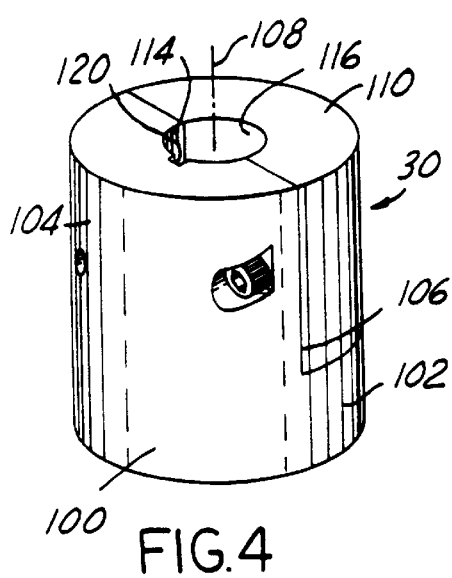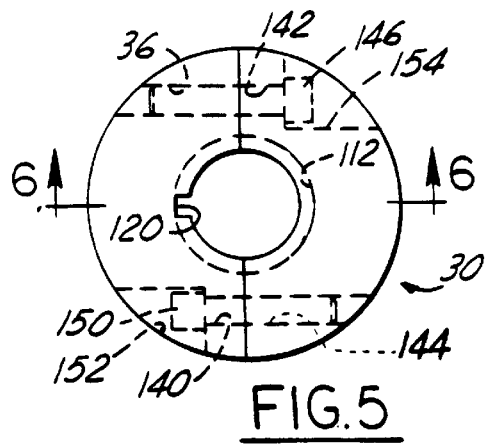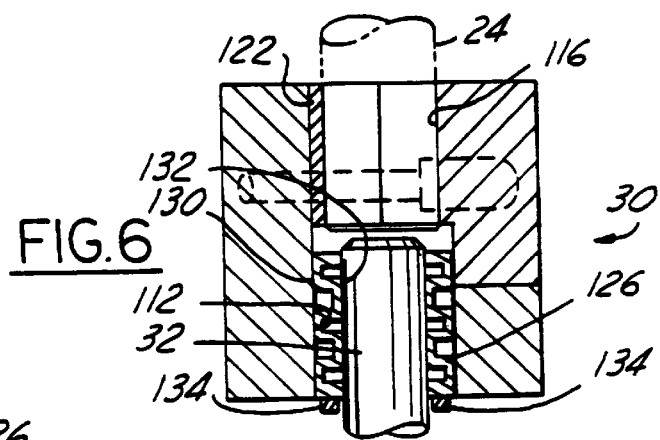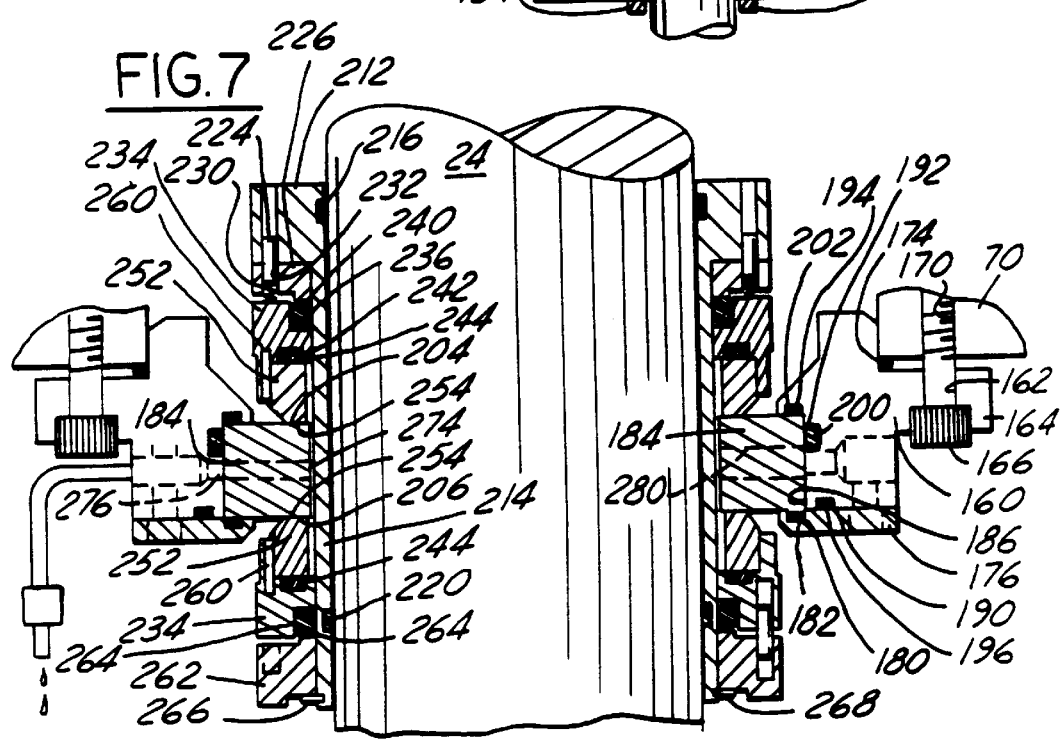

PUMP WITH IMPROVED SEAL FOR FILTRATION SYSTEMS

This is a divisional of application(s) Ser. No. 08/447,806 filed on May 23, 1995, now U.S. Pat. No. 5,655,849, which was a divisional of application Ser. No. 08/169,678, filed on Dec. 17, 1993, now U.S. Pat. No. 5,503,520.

FIELD OF INVENTION

The present invention relates to pumps used in filtration systems to pump fluids such as machine tool coolant carrying machine chips.

BACKGROUND ART

Pumps for filtration systems have a number of conventional components. The pump drive system includes a motor which is connected through bearings to a drive shaft which, in turn, is joined by a coupling to an impeller shaft. The impeller shaft has impellers or blades mounted thereon. A discharge head is provided upon which the motor is mounted and through which the drive shaft and impeller shaft pass. Surrounding the impeller shaft and connected to an inlet in the discharge head is an impeller housing. Bearings are interposed between the impeller shaft and the impeller housing to provide support to the impeller shaft. The pump is mounted relative to a container or tank containing a fluid such as machine tool coolant.

The motor drives the drive shaft which, in turn, drives the impeller shaft. The impellers rotating with the impeller shaft force fluid through the impeller housing, into the inlet of the discharge head and out a discharge outlet or tube to apparatus such as machine tools.

These filtration pumps ideally should be inexpensive to manufacture and should be reliable having a long operating life. However, conventional pumps for filtration systems have a number of shortcomings which adversely effect the cost of manufacture and their reliability.

One source of manufacturing expense, which also relates to the reliability of a pump, is the need to use oversized bearings in the pump motor. Typically, the motor has bearings which provide axial and lateral support to the drive shaft. The drive shaft is subject to large axial loads due to the fluid being pumped interacting with the impellers on the impeller shaft. The force of the fluid acting upon the impellers pushes axially downward upon the impeller shaft which then pulls downwardly on the coupling and attached drive shaft. To prevent premature failure of the motor, the bearings need to be sufficiently large to withstand this axial loading. However, the use of oversized bearings increases the cost of manufacturing the motor, and accordingly, the overall cost of the pump.

Another component of the pump which may induce premature failure is the coupling joining together the drive and impeller shafts. Traditionally, couplings are multi-piece assemblies having numerous components. If these combined components are eccentric, or not radially well balanced, the couplings can introduce unwanted radial loads and vibrations to the drive system during rotation of the drive and impeller shafts.

A third shortcoming is fatigue failure of parts related to high stress in components of the drive system, including the motor, the drive shaft, the coupling and the impeller shaft. These components are generally quite large and stiff. If axial or other misalignment occurs during their assembly, such as those due to manufacturing tolerances, tightening and forcing these components together can create large stresses and loads in the drive system.

For example, while ideally components of the drive system are perfectly coaxially aligned with one another, in reality, they cannot be practically manufactured in this manner. The more out of coaxial alignment the shafts are with respect to one another, generally the greater the loads transferred to the bearings from the shafts. Therefore, there is a need for a relief mechanism which will deform to accommodate misalignment without creating large loads or stresses in the drive system.

Another mode of pump failure is the burning out of motors. If the fluid or coolant being pumped migrates into the lubrication system of an electric motor, lubricants, which normally serve as insulators, can become electrically conductive and short out the motor. Or else, the lubricating properties of the bearings may become diminished resulting in increased frictional degradation of moving parts within the motor. Therefore, a need exists for a reliable seal system or assembly in a pump which prevents the migration of pumped fluid into the motor.

SUMMARY OF THE INVENTION

The present invention is directed to a pump that satisfies the need for an economical and reliable pump.

A pump for pumping fluid from a container is disclosed. The pump includes a discharge head supported relative to the container and defining a chamber including an inlet to receive fluid from the container, an outlet to discharge the fluid from the chamber, and an access opening. A motor is supported relative to the discharge head and has a rotatable drive shaft, which extends along a longitudinal axis, and bearings for rotatably supporting the drive shaft. The drive shaft is rotatable at a predetermined speed.

An impeller housing in fluid communication with the inlet is provided. A rotatable impeller shaft is positioned within the impeller housing and has impellers thereon for pumping fluid into the chamber through the inlet when the impeller shaft is rotated. The impellers and surrounding housing cooperatively have a predetermined thrust factor, i.e., ratio of downward thrust applied by the fluid on the impellers per unit of fluid pressure produced by the pump.

A thrust balancing means is located in the chamber of the discharge head for providing lift to the drive shaft and may include a coupling coaxially joining the drive shaft and the impeller shaft. The thrust balancing means has a projected surface of a predetermined area extending normal to the longitudinal axis of the drive shaft and facing the inlet. An outer radial periphery is formed on the thrust balancing means which cooperates with the access opening to inhibit fluid from passing therebetween while allowing the thrust balancing means to rotate relative to the discharge head.

The thrust factor of the cooperating impellers and housing and the predetermined area of the projected surface of the thrust balancing means are generally matched so as to balance the opposing forces created respectively by the fluid acting in one manner downwardly upon the rotating impeller shaft and impellers in the impeller housing while at the same time the fluid is acting in another manner upwardly upon the projected surface of the thrust balancing means thereby minimizing axial forces exerted by the drive shaft upon the bearings of the motor.

Ideally, the cylindrical coupling has a bottom surface which forms at least a part of the projected surface. Further, the thrust balancing means may include an annular thrust ring affixed to and cooperating with the coupling to form the projected surface.

Also, the discharge head may include an inner periphery of a fixed size and a radially inwardly extending thrust plate affixed thereto having an annular inner diameter defining the access opening. The thrust plate may be chosen from one of several thrust plates having identical outer peripheries which are sized to mate with the inner periphery of the discharge head and having inner diameters of varying sizes so as to offer access openings of varying sizes. Meanwhile, the thrust ring may be chosen from one of several thrust rings having identical inner diameters which are sized to mate with the coupling and having outer diameters of varying sizes which correspond to the varying sizes of the inner diameters of the thrust plates. Therefore, the predetermined area of the projected surface of the thrust balancing means can be varied during manufacture while utilizing single sized inner peripheries on discharge heads and single sized couplings.

The coupling may be made from a concentrically bored cylindrical block which is cut into an L-shaped base segment and a mating segment. The base segment has an annular base portion and a generally semi-cylindrical extended portion, the base portion having an aperture extending therethrough and the extended portion having a first arcuate clamping surface. The semi-cylindrical mating segment has a second arcuate clamping surface. The first and second arcuate clamping surfaces are configured to coaxially align with the aperture of the base portion and to clamp about one of the drive or impeller shafts.

First securement means, such as threaded bolts, are used to secure the mating segment to the base segment. Second securement means are used to secure the other of the drive or impeller shafts to the aperture of the base portion.

A method for making the coupling is provided which includes the following steps. A solid cylindrical block is provided having a longitudinal axis. A concentric hole is bored through the block along the longitudinal axis during a single chucking of the block. The block is cut into an L-shaped base segment and a mating segment. The base segment has an annular base portion with an aperture extending therethrough and a generally semi-cylindrical extended portion having an arcuate clamping surface. The mating portion has an arcuate clamping surface, the clamping surfaces being coaxially alignable with the aperture in the base portion when clamped about a shaft.

Further, a pair of fastener apertures may be machined into each of the extended portion and the mating segment, each pair of fastener apertures being laterally spaced and extending parallel to the other pair and extending perpendicular to the aperture of the base-portion. Finally, threaded fasteners are installed within the fastener apertures to clampingly secure the mating segment to the base segment.

Because the bore or bores in the original cylindrical block was formed during a single chucking, the aperture in the base portion and the arcuate clamping portions are concentric. Hence, when a drive system including the coupling joining a pair of shafts is rotated, the spinning coupling introduces very little radial loading to the drive system as a result of eccentricities in the coupling.

The pump may include a means for accommodating axial misalignment between the drive shaft and the impeller shaft. Ideally, the accommodating means is flexible and readily deforms thereby reducing radial loads exerted upon bearings by the drive shaft, the coupling and the impeller shaft. Preferably, the accommodating means includes an elongate flexible shaft having a proximate end and a distal end. The proximate end is coupled to the drive shaft and the distal end is secured to the impeller shaft. The impeller shaft may be hollow with the flexible shaft extending therethrough and affixing only to' the impeller shaft at the end farthest removed from the discharge head.

The pump may further include a seal assembly for preventing fluid being pumped from passing along the drive shaft and migrating into the motor contaminating motor fluids such as lubricants. The seal assembly is located intermediate the motor and the discharge head and seals about the rotatable shaft.

Components of the seal assembly include a support flange, an annular seal ring and a pair of seal plates. The support flange is mounted relative to the motor or the discharge head. Surrounding the drive shaft is the annular seal ring which has a pair of radially extending and axially spaced first planar seal surfaces.

The annular seal plates surround the drive shaft and axially sandwich about the seal ring. Each seal plate has a radially extending second planar seal surface dynamically sealing with one of the respective first planar seal surfaces to create a dynamic seal inhibiting fluid from passing between the first and second seal surfaces.

One of the seal ring or the pair of annular seal plates is attached to the rotatable shaft. The other is radially spaced from the rotatable shaft forming a radial collection chamber therebetween. This other of the seal ring or the pair of seal plates attaches to the support flange and has an evacuation conduit extending therethrough in fluid communication with the collection cavity.

An evacuation pump is in fluid communication with the evacuation conduit to evacuate the conduit and the collection cavity. Fluid escaping from the discharge head and lubricant escaping from the motor which pass through the dynamic seal and into the collection chamber are evacuated by the pump. Therefore, the pumped fluid cannot escape through the seal assembly and enter the motor.

Preferably, the seal ring is affixed to the support flange and the seal plates are connected to rotate with the rotatable shaft. Also, ideally, the pump is a venturi pump. A vent conduit may be provided to allow air to reach the collection cavity with fluid being evacuated from the cavity.

It is an object of the present invention to provide a pump including a motor and drive shaft which are connected to an impeller shaft by an intermediate elongate flexible shaft which easily flexes and bends so that axial misalignment of the drive and impellers will not result in large loads being placed on the bearings supporting these shafts.

It is a further object to provide a thrust balancing means in a pump responsive to pressurized pump fluid to provide a lifting force to a drive shaft which counterbalances the force the pumped fluid exerts downwardly upon impellers of the impeller shaft to thereby reduce the axial loading on motor bearings supporting the drive shaft.

It is still another object to provide a pump having a seal assembly which seals about a drive shaft to prevent the fluid being pumped from migrating into a motor contaminating fluids, such as lubricants, held therein. The seal assembly includes a collection cavity adjacent a dynamic seal which is evacuated by a pump to prevent fluid from passing through the seal assembly.

It is yet another object to provide a concentric, radially well-balanced coupling which is made by machining a bore through a cylindrical block and then cutting the bored block into an L-shaped base segment and a mating segment such that when the coupling is used in a rotating drive system to coaxially couple a pair of shafts together, the coupling and shafts will introduce minimal eccentricities and vibrations to the drive system.

BRIEF DESCRIPTION OF THE DRAWINGS

These and other objects, features, and advantages of the present invention will become better understood with regard to the following description, pending claims and accompanying drawings where:

FIG. 1 is an elevational view, partially in cutaway and partially schematic, of a first embodiment of a pump made in accordance with the present invention;

FIG. 2 is an enlarged fragmentary view of encircled area 2 of FIG. 1;

FIG. 3 is an enlarged fragmentary view of encircled area 3 of FIG. 1;

FIG. 4 is a perspective view of a coupling used in the pump of FIG. 1;

FIG. 5 is a top view of the coupling;

FIG. 6 is a side view, partially in section, of the coupling joining together a drive shaft and a flexible shaft;

FIG. 7 is an enlarged fragmentary sectional view of an evacuated sealing assembly preventing fluid from escaping past a drive shaft and entering a motor;

DESCRIPTION OF TNE BEST MODES

Figure 8:
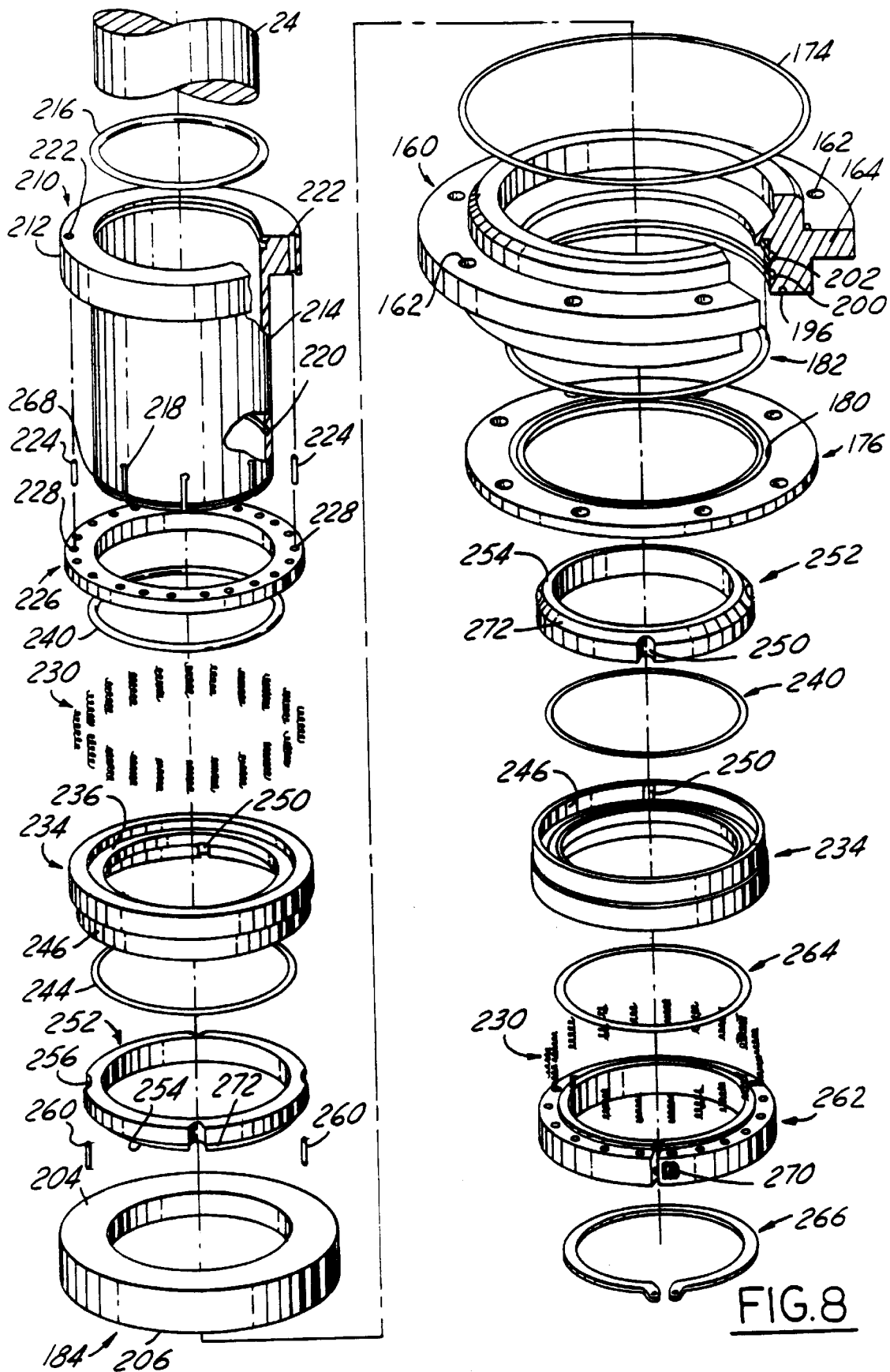
FIG. 8 is an exploded view, partially in cutaway, of components comprising the sealing assembly of FIG. 7.

A pump 20 for pumping fluids such as a machine tool coolant, made in accordance with the present invention, is shown in FIG. 1. Pump 20 includes a motor 22 rotatably driving a drive shaft 24. Surrounding drive shaft 24 is a seal assembly 26 which prevents fluid being pumped from migrating into and reaching the internal components of motor 22. A coupling 30 connects drive shaft 24 with an elongate flexible shaft 32. Flexible shaft 32, in turn, extends through and is affixed to the lower end of a hollow impeller shaft 34.

Spaced axially along impeller shaft 34 are impellers or blades 36. Impeller housing 40 encircles impeller shaft 34 and serves as a conduit through which pumped fluid may be drawn. Impeller bearings 42, shown schematically, radially support impeller shaft 34 within impeller housing 40.

Drive shaft 24, coupling 30 and flexible shaft 32 extend through a discharge head 44. A carriage 46 is provided into which pump 20, and more specifically, discharge head 44 is sealingly mounted. Carriage 46 is affixed above a container or tank (not shown) containing the fluid, such as a machine tool coolant, which is to be pumped. Pump 20 may be dropped into sealing engagement with carriage 46 without need for any further mounting. This drop-in mounting feature is more fully described in U.S. Pat. No. 5,154,584, entitled Pump For Filtration Systems, which is hereby incorporated by reference.

Discharge head 44, in cooperation with carriage 46, defines an internal chamber 50. Chamber 50 has an inlet 52, an outlet 54 and an access opening 56. Access opening 56 surrounds coupling 30 with only a small radial clearance therebetween. The nominal radial clearance preferably is on the order of 0.005". Therefore, only a limited amount of fluid or coolant can escape from discharge head 44 while coupling 30 is free to rotate relative to access opening 56.

As shown in FIG. 1, flexible shaft 32 extends through inlet 52, drive shaft 24 enters access opening 56, and outlet 54 is ifluidly connected to a discharge tube 60. Motor 22 is mounted atop discharge head 44. Impeller housing 40 is attached beneath discharge head 44 using threaded fasteners placing internal chamber 50 in fluid communication with impeller housing 40.

Motor 22 has a motor housing 62 supporting the internal components of motor 22. These components include a pair of axially spaced bearings 64 and 66, schematically shown, which rotatably support drive shaft 24. Bearings 64 and 66 transfer both radial and axial forces from drive shaft 24 to motor housing 62. Bearings 64 and 66 are bathed in lubricant, held within motor 22, to reduce friction.

Located on the lower portion of motor housing 62 is an annular base 70 having circumferentially spaced apertures 72. Threaded fasteners 74 pass through apertures 72 to affix motor 22 to threaded holes 76 in discharge head 44. A cavity 80 is formed between coupling 30, seal assembly 26 and annular base 70. A drainage conduit 82 extends through annular base 70 to allow fluid accumulating in cavity 80 to drain back into the container holding the pumped fluid.

Looking now to FIGS. 4–6, coupling 30 is generally cylindrical in shape and includes an L-shaped base segment 100 having an annular base portion 102 and an axially extending portion 104 defining an L-shaped notch 106. A generally semi-cylindrical mating segment 110 is cooperatively received into notch 106 so that coupling 30 is generally concentric and radially well-balanced. Base portion 102 has an aperture 112 extending therethrough. Opposing first and second arcuate clamping surfaces 114 and 116 are formed on respective extending portion 104 and mating segment 110. When clamped about drive shaft 24, arcuate clamping surfaces 114 and 116 are coaxially aligned with aperture 112 about a longitudinal axis 108.

A keyway 120 is machined into clamping surface 114. An elongate key 122, shown in FIG. 6, is cooperatively held in keyway 120 and in a keyway 124 formed in drive shaft 24. This connection prevents relative rotational movement between motor shaft 24 and base and mating segments 100 and 110.

A cylindrical wedging element 126 having a cylindrical outer periphery 130 engages aperture 112 in the annular base portion 102 of base segment 100 and lower diametrically enlarged portions of clamping surfaces 114 and 116. Wedging element 126 also has an inner periphery 132 for receiving flexible shaft 32. A plurality of bolts 134 extend axially into wedging element 126.

When bolts 134 are tightened into wedging element 126, internal components of wedging element 126 compress causing inner periphery 132 to contract against flexible shaft 32 and outer periphery 130 to engage aperture 112 and clamping surfaces 114 and 116 in press-fit manners. Sufficient interference fit is developed between wedging element 126, flexible shaft 32, aperture 112 and clamping surfaces 114 and 116 to prevent relative rotational movement between flexible shaft 32 and coupling 30. A preferred wedging element 126 is a Spieth Clamping Sleeve with keyless shrink fit connections available from Advanced Machine and Engine Co. of Rockford, Ill.

Extending portion 104 and mating segment 110 each have a pair of fastener receiving apertures 136, 140, 142 and 144 machined therein which extend perpendicularly to and are spaced laterally from longitudinal axis 108. Apertures 136 and 140 are threaded to receive respective bolts 146 and 150. Notches 152 and 154 are cut into extending portion 104 and mating segment 110 to accommodate heads on bolts 146 and 150 so that coupling 30 has a generally smooth outer periphery.

Notches 152 and 154 are oriented such that when coupling 30 rotates counterclockwise, with respect to FIG. 5, the notches will not scoop into any fluid surrounding coupling 30. Moreover, by orienting bolts 146 and 150 in opposing directions, coupling 30 is radially better balanced than if they were oriented in the same direction.

When bolts 146 and 150 are tightened into engagement with apertures 136 and 144, opposing clamping surfaces 114 and 116 create sufficient clamping force so that large rotational forces (torque) can be transferred between coupling 30 and drive shaft 24. Again, key 122 cooperates with keyways 120 and 124 to assist in preventing relative rotational movement between coupling 30 and drive shaft 24.

Coupling 30 comprising base segment 100 and mating segment 110 is simple and inexpensive to manufacture with good concentricity. Initially, a cylindrical block of material is used. The cylindrical block is fixtured in place and then a bore is machined by a cutting tool concentrically along longitudinal axis 108 of the cylinder. Then, the cutting tool is adjusted to cut a second larger diameter bore partially through the block. The first and second bores are concentric with one another as only one fixturing and chucking of the cylindrical block is performed.

Next, apertures 136, 140, 142, and 144 are machined into the cylindrical block. Apertures 136 and 144 are tapped so that they may receive threaded bolts 146 and 150. Notches 152 and 154 are also machined into the cylindrical block.

The block is then cut longitudinally and transversely into base segment 100 and mating segment 110. Keyway 120 is cut into arcuate clamping surface 114. Alternatively, a keyway could be cut into clamping surface 116 instead.

Therefore, the smaller first bore in the block forms arcuate clamping surfaces 114 and 116 which are adapted to clamp about drive shaft 24. The second larger bore forms aperture 112 in base portion 102 and the lower portion of clamping surfaces 114 and 116 which receive wedging element 126. As a result of this method of manufacturing, coupling 30 securely joins drive shaft 24 and flexible shaft 32 coaxially together about longitudinal axis 108. Consequently, when coupling 30 and motor shaft 24 and flexible shaft 32 are rotated, little vibration is introduced into the drive system due to eccentricity of this joint.

Motor 22 has a reservoir of lubricant which lubricates the components of motor 22. The lubricant also acts an electrical insulator to prevent short circuits across the stator and the rotor. If the lubricant becomes contaminated with the fluid being pumped, the lubricant can become electrically conductive and the motor may short out and be destroyed. similarly, lubricant contamination can reduce the friction fighting ability of the lubricant leading to increased wear in the motor and reduced motor life. Therefore, it is important that the pumped fluid or coolant be prevented from reaching the internal components of motor 22.

FIG. 7 shows an enlarged view of seal assembly 26 used to prevent pumped fluid, which escapes from discharge head 44, from passing along drive shaft 24 and entering motor 22. FIG. 8 is an exploded view of the components of seal assembly 26.

Seal assembly 26 includes components which remain static relative to motor 22 and dynamic components which are affixed to rotate with drive shaft 24. A dynamic seal is created between hard planar surfaces which are highly resistant to wear and abrasion caused by machine chips in the machine tool coolant. It is at the site of dynamic seals that fluid is particularly susceptible to bypassing seal assembly 26. Therefore, in fluid communication with the dynamic seal is a vacuum mechanism which evacuates the seal assembly to prevent fluid from passing from one side of the seal assembly to the other. Components, such as elastomeric seals which are susceptible to wear, are only used between static components to avoid friction induced wear.

Seal assembly 26 includes an annular gland plate 160 having a plurality of circumferentially spaced apertures 162 located in a radially extending flange 164. Threaded fasteners 166 are threaded into apertures 170 of base 70 of motor housing 62. An elastomeric O-ring 174 seals between gland plate 160 and base 70.

Bolted beneath gland plate 160 is an end plate 176. A groove 180 in end plate 176 retains an elastomeric O-ring 182 which seals against a static seal ring 184. Gland plate 160 and end plate 176 cooperate to form a radially inwardly opening channel 186 to retain a static seal ring 184. Gland plate 160 has grooves 190, 192 and 194 formed in channel 186 to receive elastomeric O-rings 196, 200, and 202 which seal against end plate 176 and static seal ring 184.

Static seal ring 184 has axially spaced and radially extending upper and lower seal surfaces 204 and 206. Preferably, static seal ring 184 is made of a very hard, ceramic material, such as tungsten carbide, which is highly resistant to dynamic wear and abrasion. Surfaces 204 and 206 are lapped and polished to be flat to within "one light band" of flatness, preferably about 5 millionths of an inch.

With respect to rotatable members of seal assembly 26, a sleeve 210 is affixed to drive shaft 24. Sleeve 210 has a radially outwardly extending upper flange 212 and an elongated cylinder portion 214. A pair of axially spaced O-rings 216 and 220 are interposed between drive shaft 24 and sleeve 210 to effect a seal therebetween. Diametrical spaced in flange 212 are two pin retaining holes 222 receiving pins 224. A plurality of circumferentially spaced vertical slots 218 are formed in the lower end of cylinder portion 214 so that this slotted end can be easily compressed to reduce its diameter.

Beneath flange 212 is a spring plate 226. Twenty closed-end holes 228 are circumferentially spaced about spring plate 226 to receive twenty springs 230. Spring plate 226 also has two pin retaining holes 232 to receive pins 224 in cooperation with retaining holes 222 in flange 212 to insure flange 212 and spring plate 226 rotate together with drive shaft 24.

Positioned beneath spring plate 226 is a retaining ring 234. When seal assembly 26 is assembled together, springs 230 press against retaining ring 234 to place an internal compressive axial force across seal assembly 26. Formed on the inner radius of retaining ring 234 is an L-shaped notch 236 which receives an O-ring 240 against cylinder portion 214 of sleeve 210 and spring plate 226 to seal this intersection. On the underside or inboard side of retaining ring 234 is a downwardly opening channel 242 which carries an O-ring 244. Located on the outer radial portion of retaining ring 234 is a downwardly depending flange 246 having four circumferentially spaced scallops 250 formed on its inner radial surface. An identical retaining plate 234, which is inverted, is located on the opposite axial side of static seal ring 184 as will be described later.

Sandwiching about static seal ring 184 are a pair of rotating dynamic seal plates 252 each having a seal surface 254 which respectively and dynamically engage seal surfaces 204 and 206 of static seal ring 184. Like static seal ring 184, dynamic seal plates 252 are preferably made of tungsten carbide and each of seal surfaces 254 is ideally flat to within one lightband. Located on the outer radial periphery of seal plates 252 are scallops 256 which cooperate with scallops 250 in respective retaining plates 234 to secure pins 260 therebetween. The captured pins 260 cause dynamic seal plates 252 to rotate with retaining rings 234.

Situated beneath the lower dynamic seal plate 252 is the second retaining plate 234 with another O-ring 244 sealing therebetween. Spacer clamping ring 262 locates under lower retaining plate 234 with O-ring 264 sealing therebetween. Spacer clamping ring 262 is a split ring and has a pair of ends joined by a bolt 270. Bolt 270 can be tightened to reduce the diameter of spacer clamping ring 262 about the slotted lower end of cylinder portion 214 to clamp sleeve 210 to drive shaft 24 whereby they rotate together. Finally, a snap retaining ring 266 is received within a retaining groove 268 at the lower end of cylinder portion 214 of sleeve 210. Snap retaining ring 266 abuts spacer ring 262.

As described above, the presence of the twenty springs 230 compressively biases seal surfaces 254 on dynamic seal plates 252 into abutting engagement with respective seal surfaces 204 and 206 of static seal ring 184 thereby creating a dynamic seal between the static and dynamic or rotating components of seal assembly 26.

Formed between the inner radial surfaces of static seal ring 184 and dynamic seal plates 252 and the outer diameter of cylinder portion 214 of sleeve 210 is a radial collection chamber 274. Migrating pumped fluid from discharge head 44 or leaking lubricant from motor 22 collect in this collection chamber 274.

An evacuation conduit 276 and a vent conduit 280 extend through static seal plate 184 and gland plate 160. A pump P, preferably a venturi pump, is fluidly connected to evacuation conduit 276 to draw a vacuum thereacross and also in collection chamber 274. Air is supplied to collection chamber 274 by vent conduit 280. Any fluid reaching collection chamber 274 is evacuated and (not shown) dumped into the container from which the pumped fluid came. Accordingly, pumped fluid being pumped by pump 20 which migrates from discharge head 44 and into seal assembly 26 cannot readily escape seal assembly 26 to reach and contaminate lubricant in motor 22.

Those skilled in the art will appreciate that seal assembly 26 could also be designed with dynamic seal plates 252 being statically affixed relative to motor 22 and static seal ring 184 could be secured to rotate with drive shaft 24. Also the evacuation and vent conduit could be routed through different components of the seal assembly and still evacuate a migrating collection of pumped fluid. Such design changes are within the spirit and scope of this invention.

Looking back to FIG. 1, flexible shaft 32 has a proximate end 300 clamped within coupling 30 and a distal end 302 attaching to a second end 304 of impeller shaft 34. This connection is shown in more detail in FIG. 3. Attached to and surrounding distal end 302 is a wedge member 310 having a frustoconical portion 312 and a threaded portion 314. Affixed within second end 304 of impeller shaft 34 is a wedge member 316 which tapers oppositely to frustoconical portion 312. A jam nut 320 is threaded onto threaded portion 314 of wedge member 310 causing wedge member 316 to move axially into wedging engagement with wedge member 310. This wedging action causes an interference fit between flexible shaft 32, frustoconical portion 312, wedge member 316 and impeller shaft 34 thereby connecting flexible shaft 32 to impeller shaft 34. This rigid coupling of flexible shaft 32 with impeller 34 is preferably made using a commercially available Trantorque connector such one sold by Fenner Manheim of Manheim, Pa.

FIG. 2 shows the upper end of impeller shaft 34 surrounding flexible shaft 32. An O-ring 322 is held within an annular channel 324 in a first end 326 of impeller shaft 34 and seals about flexible shaft 32. This O-ring prevents the flow of dirty coolant contaminated with particulates into the space between flexible shaft 32 and impeller shaft 34. First end 326 is generally free to rotate about an axis extending perpendicular to the longitudinal axis of the impeller shaft 34.

Torque is generally transferred only between distal end 302 of flexible shaft 32 and second end 304 of impeller shaft 34. A portion of a bearing 42 is also shown in FIG. 2 connecting to the outer periphery of impeller shaft 34.

As a result of inserting flexible shaft 32 between coupling 30 and impeller shaft 34, loads transferred to bearings supporting drive shaft 24, coupling 30 and impeller shaft 34 are reduced as compared to rigidly connecting impeller shaft 34 directly to coupling 30. If coupling 30, drive shaft 24 and impeller shaft 34 are slightly out of coaxially alignment, flexible shaft 32 will bend to accommodate the misalignment without creating large loads which must be carried to the bearings of the drive system of pump 20.

Pump 20 in FIG. 1 is designed to minimize the axial loading upon motor bearings 64 and 66 due to the downward thrust of the pumped fluid upon the impellers 36. This downward thrust is then transferred to impeller shaft 34, flexible shaft 32, coupling 30 and finally drive shaft 24 which is supported by bearings 64 and 66. The fluid being driven upwardly by impellers 36 creates pressure in the fluid which also acts upwardly on coupling 30.

The ratio of downward thrust on an impeller per unit of fluid pressure produced by the combination of a rotating impeller and surrounding housing is referred to as the thrust factor of the impeller and housing. This thrust factor is experimentally determined and is provided by manufacturers of impellers and their housings. Accordingly, knowing the particular thrust factor of impeller 36 and impeller housing 40, the required balancing area of projected surface 350 upon which the pressurized fluid acts is easily determined.

The combination of the bottom surface of the annular base portion 102 and wedging element 126 define a projected surface 350 extending generally perpendicular to the longitudinal axes of flexible shaft 32 and drive shaft 24. The size or area of this projected surface 350 is predetermined to be responsive to pumped fluid pressure to create an upward lift on coupling 30 to balance the downward fluid force on impellers 36. Therefore, coupling 30, if properly sized, acts as a thrust balancing means.

Consequently, the axial load across bearings 64 and 66 and drive shaft 24 is relatively small. This allows for smaller bearings 64 and 66 and a smaller drive shaft 24 to be used with increased operating life for motor 22 than if no thrust balancing means were used. The smaller bearings and drive shaft result in a less expensive motor 22 being required to be used in pump 20.

The top surface of coupling 30 is located outside access opening 56 in discharge head 44. As described above, a small radial gap is located between access opening 56 and the outer diameter of coupling 30 which permits coupling 30 to rotate relative to discharge head 44; however, it also allows fluid to escape through the radial gap into cavity 80. Once in cavity 80, the coolant has little or no pressure therein as the fluid has escaped from a very narrow radial gap into a large, open region. Accordingly, the downward pressure applied by the coolant upon coupling 30 is inconsequential. Forces exerted upon the radial surfaces of coupling 30 by the coolant within chamber 50 will cancel each other out and not affect the vertical lift provided to coupling 30.

Figure 10:
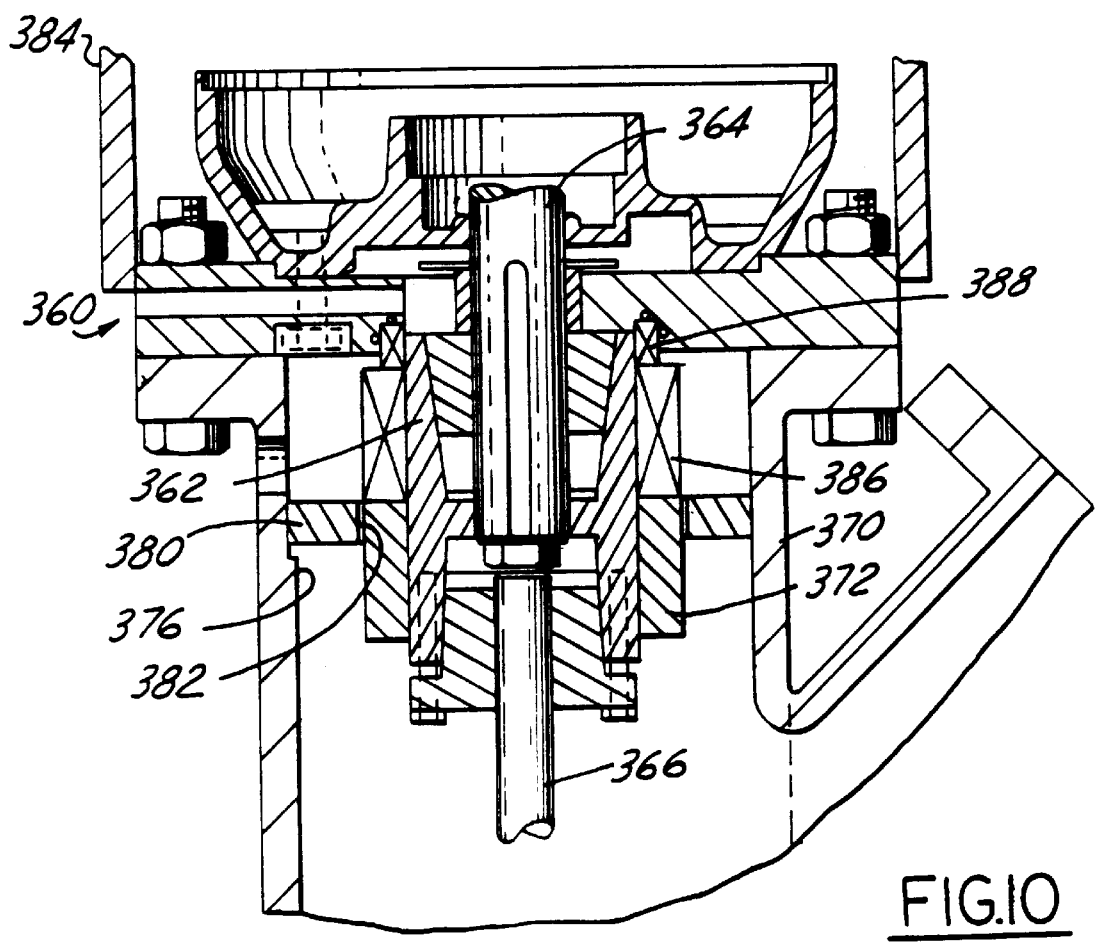
FIG. 10 is a view, partially in section, of a third embodiment of a pump including a Y-shaped discharge head.

FIG. 10 illustrates a fragmentary view of an alternative embodiment for a pump 360. Pump 360 utilizes a coupling 362 to secure together a drive shaft 364 and a flexible shaft 366. Coupling 362 is located in a discharge head 370 that is Y-shaped rather T-shaped as with pump 20. Attached to the cylindrical exterior of coupling 362 is a rotating thrust ring or collar 372 which is affixed to rotate with coupling 362. The combined projected surface 374 of coupling 362 and thrust plate 372, which is exposed to pumped or pressurized fluid or coolant and which extends perpendicular to the longitudinal axis of drive shaft 364 and flexible shaft 366, is effective in providing counteracting lift to drive shaft 364.

Extending radially inward from an inner periphery 376 of discharge head 370 is a stationary thrust plate 380. Coolant pushing upward upon stationary thrust plate 380 will not provide lift to the coupling 362 and drive shaft 364. The inner diameter 382 on stationary thrust plate 380 serves as an access opening which allows drive shaft 364, coupling 362 and rotating thrust ring 372 to extend therethrough while allowing only a limited amount of coolant to escape thereabove. Again, the coolant escaping above and pressing downwardly upon rotating thrust ring 372 and coupling 362 will provide very little downward force.

An advantage offered by this particular design is that total area of the projected area 374 upon which the coolant pushes upwardly on can be modified without changing the size of either the coupling 362 or inner periphery 376 of discharge head 370. Rather, a stationary thrust plate 380 may be chosen from one of several thrust plates having identical outer peripheries which are sized to mate with inner periphery 376 of discharge head 370 and having inner diameters of varying diameters so as to offer access openings of varying sizes. Correspondingly, a rotating thrust ring 372 may be chosen from one of several thrust rings having identical inner diameters which are sized to affix to the outer periphery of coupling 362 and having outer diameters of varying sizes which correspond to the varying sizes of the inner diameters of the stationary thrust plates. Consequently, the predetermined area of the projected surface of the thrust balancing means of pump 360 can be easily varied during manufacture while utilizing single sized discharge heads and couplings.

Pump 360 is shown with a shroud 384 which surrounds a motor (partially shown) of pump 360 so that the motor may be submerged below the top of the level of the fluid in a container. A rotating seal assembly 386 cooperates with a stationary seal assembly 388 to prevent the pumped fluid from entering the motor. Again, flat plates of tungsten carbide are utilized to effect a dynamic seal.

Figure 9:
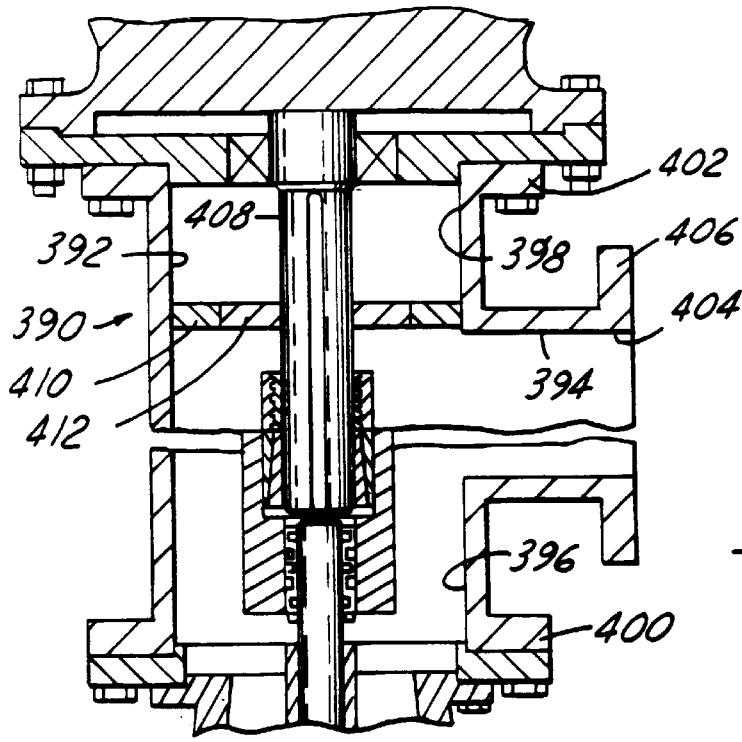
FIG. 9 is a view, partially in section, of a second alternative embodiment of a pump including a T-shaped discharge head.

FIG. 9 shows an alternative design for a T-shape discharge head 390. Discharge head 390 includes main tubular portion 392 which is intersected and joined by a transverse tubular portion 394. The ends of main tubular portion 392 have inlet and access openings 396 and 398 which are surrounded by inlet and outlet flanges 400 and 402. Similarly, transverse tubular portion 392 has discharge opening 404 surrounded by a discharge flange 406. Discharge head 390 is particular easy and inexpensive to manufacture requiring only the welding of flanges 400, 402, and 406 to a standard T-pipe fitting.

Secured to rotate with a drive shaft 408 is a rotating thrust ring 410. Affixed to the inner periphery of discharge head 390 is a stationary thrust plate 414. Rotating thrust ring 410 functions as a thrust balancing means providing lift to drive shaft 408.

Figure 11:
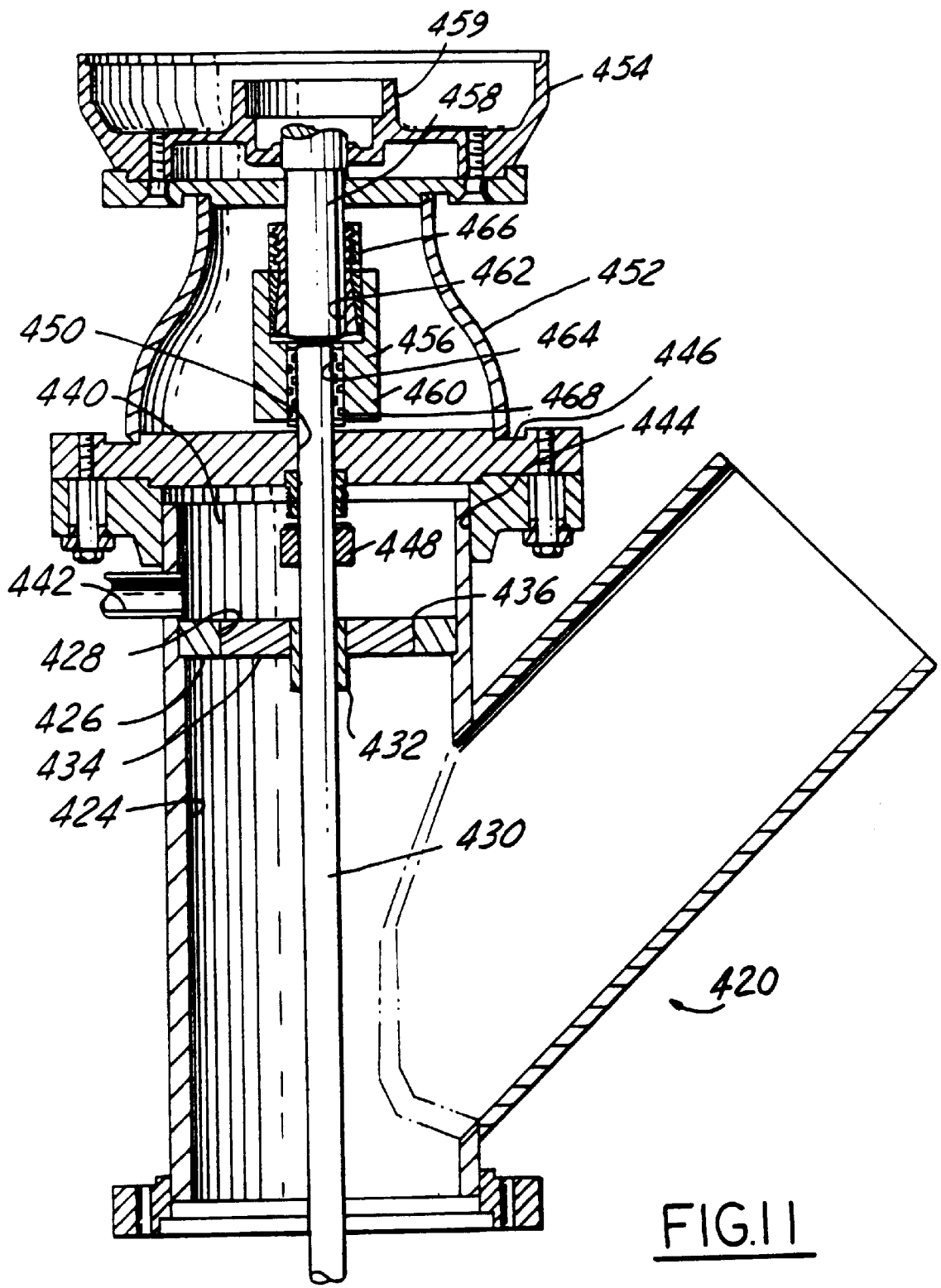
FIG. 11 is sectional view of a fourth embodiment of pump having T-shaped discharge with a thrust balancing means separate from a coupling which is located outside of a discharge head.

FIG. 11 illustrates a portion of a pump 420 having a Y-shaped discharge head 422. An inner periphery 424 of discharge head 422 has an annular inwardly extending stationary thrust plate 426 affixed thereto which has an access opening 428 defined by its inner radial periphery.

Affixed to rotate with a flexible shaft 430, which is attached to an impeller shaft (not shown), is a collar 432 and a rotating thrust plate 434. The outer periphery of rotating thrust plate 434 is rotatable relative to access opening 428 of stationary thrust plate 426 with a small clearance gap 436 being formed therebetween. Again, the sizes of rotating thrust plate 434 and stationary thrust plate 426 are appropriately chosen to cooperate with the fluid pressure imposed on rotating thrust plate 434 to counterbalance downward thrust on impellers of pump 420 to minimize axial loading on motor bearings of the pump motor.

Coolant may escape through gap 436 and be received within an upper cylinder chamber 440 in discharge head 422. A drainage conduit 442 is in fluid communication with upper chamber 440 to allow fluid accumulating in upper chamber 440 to drain back into a container or tank containing the fluid being pumped.

An annular flange 444 is affixed to the outer periphery of the upper end of discharge head 422. A transverse plate 446 extends across flange 444 and is bolted thereto. A seal assembly 448 inhibits coolant or the fluid being pumped from migrating through a central opening 450 in transverse plate 446 through which flexible shaft 430 extends.

A bell-shaped housing 452 connects transverse plate 446 with a motor housing 454 Located within housing 452 is a coupling 456 which joins flexible shaft 430 to a drive shaft 458 which is rotatably driven by a motor 459 (partially shown). Coupling 456 utilizes a concentrically bored cylindrical block 460 having first and second apertures 462 and 464. First and second connectors 466 and 468 are used to connect flexible shaft 430 and drive shaft 458 to respective apertures 462 and 464. As shown, connectors 466 and 468 are of the types previously described above including a Trantorque wedge connector and a Spieth Clamping Sleeve.

While in the foregoing specification of this invention has been described in relation to certain preferred embodiments thereof, and many details have been set forth for the purpose of illustration, it will be apparent to those skilled in the art that the invention is susceptible to alteration and that certain other details described herein can vary considerably without departing from the basic principles of the invention.

What is claimed is:

1. A pump for pumping a fluid from a container, the pump comprising:

a discharge head supported relative to the container and having a chamber including an inlet to receive fluid from the container, an outlet to discharge the fluid from the chamber, and an access opening;

a rotatable drive shaft extending along a longitudinal axis;

a motor positioned relative to the discharge head and having fluids held therein and bearings supporting the drive shaft, the drive shaft being rotatably affixed to and driven by the motor;

an impeller housing in fluid communication with the inlet;

a rotatable impeller shaft positioned within the impeller housing and having impellers located thereon for pumping fluid into the chamber through the inlet when the impeller shaft is rotated;

a coupling connecting the drive shaft to the impeller shaft;

one of the drive shaft, the coupling or the impeller shaft extending through the access opening in the discharge head with a radial gap being formed therebetween to inhibit the flow of fluid through the access opening;

a seal assembly located intermediate the motor and the discharge head and sealing about the rotatable shaft, the seal assembly comprising:

a support flange mounted relative to the motor or the discharge head;

an annular seal ring surrounding the drive shaft and having a pair of radially extending and axially spaced first planar seal surfaces;

a pair of annular seal plates surrounding the drive shaft and axially sandwiching about the seal ring, each seal plate having a radially extending second planar seal surface dynamically sealing with one of the respective first planar seal surfaces to create a dynamic seal inhibiting fluid from passing between the first and second seal surfaces;

one of the seal ring or the pair of annular seal plates attaching to the rotatable shaft; the other of the seal ring or the pair of seal plates being radially spaced from the rotatable shaft forming a radial collection gap therebetween and attaching to the support flange and having an evacuation conduit extending therethrough in fluid communication with the collection gap;

an evacuation pump in fluid communication with the evacuation conduit to evacuate the conduit and the collection gap;

whereby fluid escaping from the discharge head and fluid escaping from the motor which pass through the dynamic seal and into the collection gap are evacuated by the pump so that the pumped fluid cannot escape from the seal assembly and enter the motor contaminating the fluid held within the motor.

2. The pump of claim 1 wherein:

the seal ring is affixed to the support flange and the seal plates are connected to rotate with the rotatable shaft.

3. The pump of claim 1 wherein:

the evacuation pump is a venturi pump.

4. The pump of claim 1 wherein:

the planar seal surfaces are flat to within one lightband.

5. The pump of claim 1 wherein:

the one of the seal ring or the pair of seal plates having the evacuation conduit includes a second vent conduit to allow air into the collection gap.

6. An improved seal assembly for use in a pump for pumping a fluid from a container, the pump including:

a discharge head supported relative to the container and having a chamber including an inlet to receive fluid from the container, an outlet to discharge the fluid from the chamber, and an access opening;

a rotatable drive shaft extending along a longitudinal axis;

a motor positioned relative to the discharge head and having bearings supporting the drive shaft and a fluid held therein, the drive shaft being rotatably affixed to and driven by the motor;

an impeller housing in fluid communication with the inlet;

a rotatable impeller shaft positioned within the impeller housing and having impellers located thereon for pumping fluid into the chamber through the inlet when the impeller shaft is rotated;

a coupling connecting the drive shaft to the impeller shaft;

one of the drive shaft, the coupling or the impeller shaft extending through the access opening in the discharge head and cooperating therewith to inhibit pumped fluid from passing through the access opening;

the seal assembly located intermediate the motor and the discharge head and sealing about the rotatable shaft, the seal assembly comprising:

a support flange for mounting relative to the motor or the discharge head;

an annular seal ring for surrounding the drive shaft and having a pair of radially extending and axially spaced first planar seal surfaces;

a pair of annular seal plates for surrounding the drive shaft and axially sandwiching about the seal ring, each seal plate having a radially extending second planar seal surface dynamically sealing with one of the respective first planar seal surfaces to create a dynamic seal inhibiting fluid from passing between the first and second seal surfaces when the seal assembly is installed about the drive shaft;

one of the seal ring or the pair of annular seal plates adapted for attaching to the rotatable shaft; the other being adapted to be radially spaced from the rotatable shaft so as to form a radial collection gap therebetween and being attachable to the support flange and having an evacuation conduit extending therethrough in fluid communication with the radial collection gap;

an evacuation pump in fluid communication with the evacuation conduit to evacuate the conduit and the radial collection gap;

whereby when the seal assembly is mounted to the pump, pumped fluid escaping from the discharge head and fluid escaping from the motor which pass through the dynamic seal and into the radial collection gap are evacuated by the pump so that the pumped fluid cannot escape from the seal assembly and enter the motor contaminating the fluid held within the motor.

* * * * *